Inventors.
Samuel C. Collins.
Win W. Paget

July 1, 1952    S. C. COLLINS ET AL    2,601,764
APPARATUS FOR PROVIDING OXYGEN OR OTHER
GASES TO MEET VARIABLE DEMANDS
Filed Oct. 18, 1949    3 Sheets-Sheet 3

Inventors:
Samuel C. Collins.
Win W. Paget.
by
Anis A. Maxson.
Atty.

Patented July 1, 1952

2,601,764

UNITED STATES PATENT OFFICE 2,601,764

APPARATUS FOR PROVIDING OXYGEN OR OTHER GASES TO MEET VARIABLE DEMANDS

Samuel C. Collins, Watertown, Mass., and Win W. Paget, Michigan City, Ind., assignors to Joy Manufacturing Company, Pittsburgh, Pa., a corporation of Pennsylvania Application October 18, 1949, Serial No. 122,078

25 Claims. (Cl. 62—1)

1

This invention relates to apparatus for providing oxygen or other gases to meet variable demands. It will be described particularly with reference to the provision of oxygen, but will be understood not to be so limited.

In Patent No. 2,588,656 for methods of and apparatus for treating gases the application for which was filed by Win W. Paget of even date herewith, there is disclosed an essentially self-regulating apparatus for freeing compressed air from solidifiable impurities such as water vapor and carbon dioxide, and for making available from the so purified compressed air, by a method and apparatus employing refrigeration and rectification, oxygen with a purity of 99.5% or better, and for delivering the oxygen, in the particular example described, at pressures either on the order of 50 p. s. i. or on the order of 2000 p. s. i. 50-pound oxygen is suited to the needs of manufacturing plants, chemical plants, steel plants, etc., and 2000-pound oxygen is adapted for cylinder charging.

In many plants in which it would be very economical to employ an oxygen generator of the kind which is disclosed in the application above identified, the demand for oxygen fluctuates considerably, and periods during which the shop demand is precisely equal to the oxygen production rate are few and far between and also of short duration. Instead, there will be periods when the plant demand will be much less than the oxygen producing capacity of the apparatus, hereinafter referred to as the generator, and periods when the demand will substantially exceed the maximum production rate of the generator. When the demand is less than the output of the generator, it is not desirable to shut the latter down, but rather to store the excess of oxygen, and this may best be done by charging a bank of cylinders with the excess oxygen or storing the oxygen in a special receptacle capable of withstanding pressures of 2000 p. s. i. or more. When the demand exceeds the output of the generator, it is desirable to be able to augment the output of the generator by oxygen drawn from a bank of cylinders or other high pressure storage device.

Oxygen demand of plants may well be for oxygen at a pressure on the order of 50 p. s. i., and, as above indicated, oxygen at 2000 p. s. i. is desirable for cylinder charging. The oxygen generator of the application above identified is capable of delivering oxygen at either of the pressures mentioned, as has been noted above. Its production of oxygen in cubic feet per hour

2 at standard pressure and temperature will be considerably greater of course when production is at 50 p. s. i. than when it is at 2000 p. s. i. It is therefore preferable to operate the apparatus in such a manner as to produce 50-pound oxygen as much of the time as possible.

The apparatus disclosed in said application includes two control elements which by their adjustments transform the unit from suitability for producing 50-pound oxygen to readiness for producing 2000-pound oxygen, and vice versa. These control elements are a means for varying the point of cutoff of the expansion engine which forms a portion of the generator, and a means for selectively directing the expansion engine exhaust either into the column at a point somewhat below the top of the latter, or in the specific single column form shown for purposes of illustration, through a heat exchanger, a check valve, a condenser, another heat exchanger, a pressure reducing valve, certain jacketing devices (which constitute refinements of the apparatus and may be omitted), and then into the top of the column. It will be appreciated, as the disclosure of this present application proceeds, that change to early cutoff and delivery of the exhaust from the expansion engine directly into the column near its top should both be effected, while the system is operating normally, relatively nearly substantially simultaneously, and that change to later cutoff—a cutoff suited to 50-pound oxygen production—from the early cutoff used during 2000-pound oxygen production, and interruption of the direct communication between the expansion engine exhaust and the point near the top of the column, should be interrupted substantially simultaneously, while the system is operating normally.

According to a preferred embodiment of the present invention, an apparatus of the character disclosed in said above identified application and hereinabove briefly summarized in some of its characteristics, is arranged with its oxygen product line (it will be noted that it uses the same product line regardless of the pressure at which the oxygen is to be delivered) connected with a shop line through a valve having the characteristic that oxygen may be discharged freely past this valve to the shop line when the downstream (shop line) pressure is lower than $(p+10)$ p. s. i. (where $p$ is the pressure in p. s. i. selected for normal for the shop line). Further, in a preferred embodiment, the product delivery line of the oxygen generating apparatus may be connected through a check valve opening towards the cylinders, to a bank of oxygen cylinders, all of the oxygen cylinders being in communication normally with the check valve controlled line which leads to the cylinder bank. Desirably, there will be provided a relief valve set at the desired maximum pressure to which the cylinders are to be charged, which relief valve may open and blow off to waste excess oxygen when the pressure in the cylinders builds up to the full desired limit. Understand that the bank of cylinders may be replaced by a special storage vessel, as above explained. There may further desirably be provided another automatic valve, set to permit flow from the cylinder bank to the shop line when the downstream (shop line) pressure falls below $(p-10)$ p. s. i., where $p$ is the value previously mentioned. Thus the cylinder bank, or other high pressure storage means, may constitute a reserve or standby source of oxygen for periods of temporary high demand. Desirably, but not necessarily, there may be provided a large low pressure storage reservoir in communication with the shop line, so that there may be available low pressure storage capacity. Desirably, means may be provided for automatically effecting opening of the bypass previously mentioned and the making of cutoff earlier, say when the shop line pressure exceeds $p$ p. s. i., and for automatically closing the bypass and concurrently making cutoff later in the expansion engine cycle when the shop line pressure becomes equal to $(p-5)$ p. s. i., for example, the value of $p$ being as above mentioned. Desirably, since the change in point of cutoff and the change in position of the bypass valve are, during normal production, to be made at least substantially simultaneously, a pressure responsive pilot valve connected with the shop line and responsive to the pressure in the latter may be utilized for the control both of the cutoff changing mechanism and for the bypass control mechanism. The control by the pilot valve may be of fluid coming from the shop line, or, preferably, of operating fluid coming from the air compressor or the like which supplies air under pressure to the oxygen generator.

Since during the cooling down period it is desirable initially to operate with the bypass open and the expansion engine operating with late cutoff, and since further, when the apparatus is being put into operation, there will be, in a preferred embodiment at least, no pressure in the shop line sufficient to effect the movement of the requisite control devices to provide for opening of the bypass, the arrangements so far outlined may desirably be supplemented by two further control valves, preferably time controlled valves, one for cutting off the pilot valve from communication with the shop line for on the order of three hours or so and subjecting it during such period to compressed air supply pressure. The other desirably interrupts, for a period of on the order of two hours, the communication with vent of a line leading to the variable cutoff mechanism, and effects a supply to the latter of air from the compressed air supply line in a manner to maintain cutoff relatively late. As above pointed out, the apparatus desirably starts with the bypass valve open but with cutoff late, so as to speed up the refrigeration process. On closing of the first time controlled valve, there would be a shortened period of admission to the expansion engine, while the bypass valve would be maintained open and liquid would accumulate in the column. On operation of the valve having the longer time delay period, the system will be put into a condition for the control of the pilot valve by the shop line pressure. If the system were not returned to shop-line-pressure control of the pilot valve at the earliest possible time when conditions would be suitable for this, all that would happen would be that the generator would continue to operate according to its cylinder charging mode of operation.

An object of this invention is to provide an improved apparatus for providing oxygen (or some other gas) to meet variable demands. Another object of the invention is to provide an improved oxygen supply system for shop lines or the like including an oxygen generating apparatus and storage means, and automatic control means for supplying the shop line or the like from one or both of said sources depending upon the pressure existing in the shop line. A further object of the invention is to provide an improved apparatus for supplying shop lines, or the like, from an oxygen generator adapted to provide oxygen at a plurality of rather widely differing pressures, and having improved controlling means for shifting production of the generator from one product to the other, automatically depending upon shop line pressure. A further object of the invention is to provide an improved automatic controlling arrangement for a generator for a desired gas, which generator is adapted to deliver the gas at widely differing pressures, so that the generator shall be automatically brought in a preferred manner to normal production conditions, and caused to deliver the gas at the pressure called for by shop line conditions. Another object is to provide an improved gas generator adapted to produce the gas it is intended to supply at two widely different pressures, and to provide therefor improved means for delivering the product gas to a supply line or to storage automatically dependent upon supply line pressure conditions. A further object of the invention is to provide an improved generating system for a desired gas designed to deliver its product at widely differing pressures, and having controlling means for effecting automatic shift between modes of operation suited to the different product pressures, and having pilot control means responsive normally to product pressure, for governing shifting from one mode to the other by pressure operated devices actuated by the pressure of the gaseous mixture supplied to the generator for separation thereby, but including means, desirably time controlled, whereby the pilot control means may, during starting, be subjected to the supply-pressure of the mixture to be separated instead of to product pressure. Other objects and advantages of the invention will hereinafter more fully appear.

In the accompanying drawings in which one illustrative embodiment of an oxygen supply system in which the invention is incorporated is shown for purposes of illustration.

Figure 1:
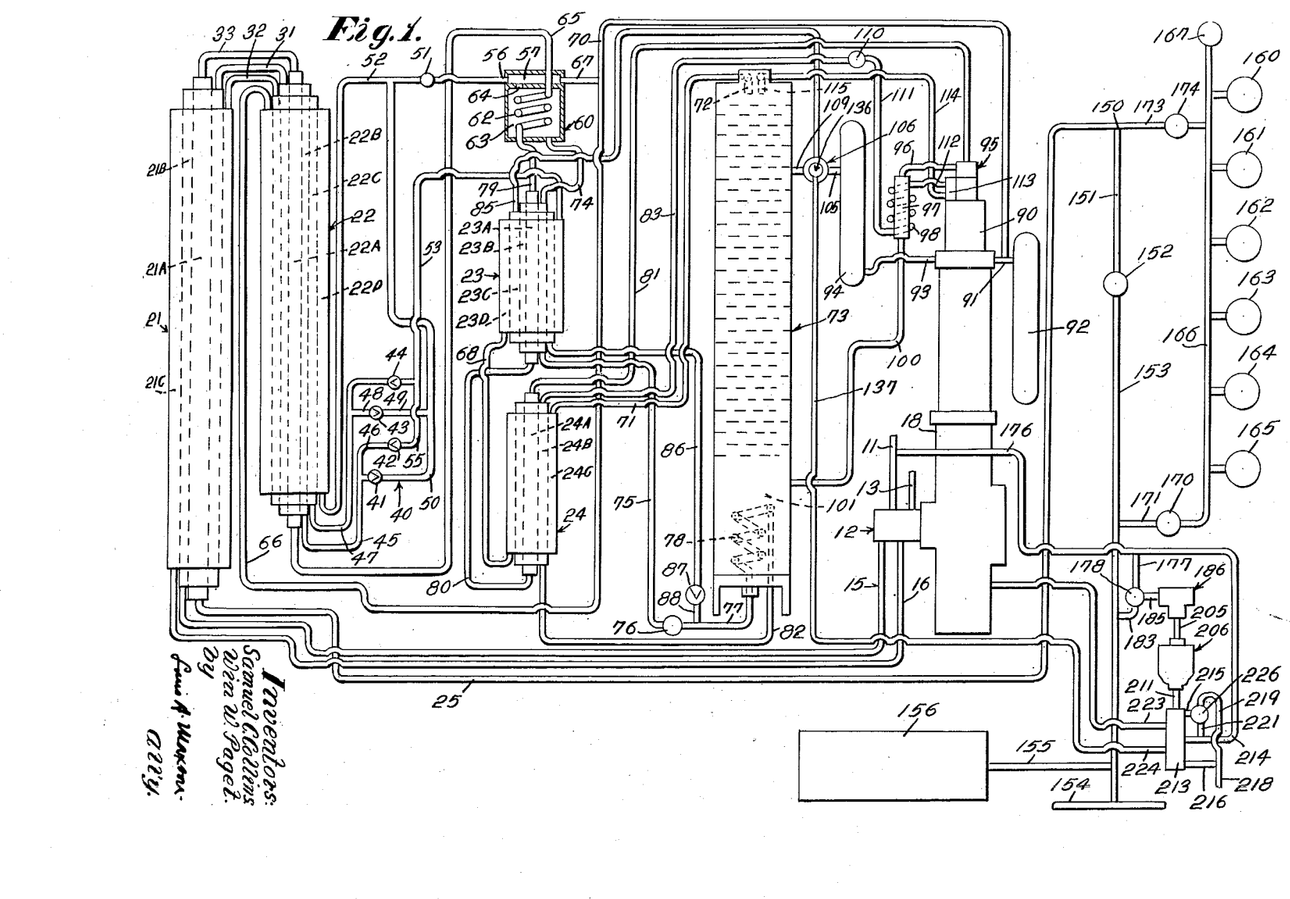
Fig. 1 is a diagrammatic view showing the supply system.

Referring first to Fig. 1 of the drawings, in which an oxygen generator of the single column type is shown—though it will be evident that a double column apparatus might equally well be employed—it will be observed that an oxygen generating apparatus is disclosed including an expansion engine 18, heat exchangers 21, 22, 23 and 24, an evaporator-condenser 60, a single column 73 containing another evaporator-condenser in its lower end, and a liquid oxygen pump 95. Air is supplied at a suitable pressure, on the order of 160 pounds per square inch, through a supply connection 11, as from a two-stage compressor with aftercooler, of a capacity substantially the same as the processing capacity of the generating apparatus; and the compressed air is adapted to be shifted, by an automatic reversing valve device 12 of a snap action type actuated at uniform intervals from the expansion engine, between conduits 15 and 16, that one of these conduits which is not connected at any given time to the supply line 11 being connected to a vent line 13. The structure of the reversing valve mechanism may assume various forms, and one which is adequate for the purpose is shown in the application of Samuel C. Collins, Ser. No. 661,253, filed April 11, 1946. Conduits 15 and 16 connect respectively to courses 21B and 21C of the heat exchanger 21, and these courses are connected by conduits 31 and 32 with courses 22B and 22C of heat exchanger 22. Beyond the heat exchanger 22 there is arranged a series of check valves which cooperate with the automatic reversing valve 12 in effecting the reversals of flow of incoming air and outgoing effluent, with respect to the B and C courses of the heat exchangers 22 and 21 and the conduits 15 and 16. This reverse valve mechanism, made up of four check valves, is generally designated 40 and includes four automatic check valves 41, 42, 43, 44. This arrangement is disclosed in the Samuel C. Collins application, Ser. No. 661,253. The lower end of course 22B has connected with it a conduit 45 which leads to the check valve 41 and a branch 46 leads from conduit 45 to check valve 42. A conduit 47 leads from course 22C to check valve 44 and a branch 48 connects conduit 47 at a point between course 22C and the check valve 44, with the check valve 43. A conduit 49 connects the other side of check valve 43 with a conduit 50 leading from the check valve 41 to a suitable restrictor device 51 which creates a slight difference between the pressure in the conduit 50 and the pressure beyond the device 51, the latter pressure being on the order of 2 pounds less than the pressure in conduit 50. A conduit 52 connects the conduit 50 with the bottom of a course 22D which is incorporated in the heat exchanger 22 but which is without counterpart in exchanger 21. A conduit 53 leads from the side of check valve 44 opposite the conduit 47, to the outermost course of the heat exchanger 22. Nitrogen always flows outwardly through the conduit 53. A conduit 55 connects the side of check valve 42 opposite the conduit 46 to the conduit 53. Each of the check valves 41, 42, 43, and 44 opens in the direction indicated by the point of the "V" and prevents opposite flow.

The heat exchangers 21 and 22 each have courses for the oxygen product, these courses numbered respectively 21A and 22A; and these courses are connected by a conduit 33; and course 21A is connected with an oxygen product line 25. The restrictor 51 is connected at 56 to a chamber 57 within the top of the evaporator-condenser 60.

Within the casing of the evaporator-condenser 60 there is an oxygen conducting course 62 connected by a conduit 65 with the lower end of course 22A of exchanger 22. There is also an air conducting course 63 in close heat exchange relation with the oxygen course 62 of the evaporator-condenser 60. The course 63 is connected at 64 with the chamber 57.

The top of course 22D of exchanger 22 is connected by a conduit 66 with a conduit 67 leading from the chamber 57, and the reunited stream of air passes to a conduit 70 which leads to the expansion engine 18 later more fully described.

The recirculation of a portion of the air which has passed through both of the heat exchangers 21 and 22, through the course 22D of the exchanger 22, results in the complete separation of water vapor and carbon dioxide out of the entering air stream. The duration of flow between switchings of the incoming air and the outgoing nitrogen between the courses which they alternatively occupy is on the order of three minutes.

When the air entering the system is passing through course 22B, it flows past the check valve 41. When course 22B is serving for outflow of nitrogen, the nitrogen flows from conduit 53, through conduit 55 and past check valve 42 and through conduits 46 and 45 to course 22B. When course 22C is serving for inflow of air, the entering air flows past the check valve 43. When course 22C is being used to conduct leaving nitrogen, the nitrogen flows past check valve 44 and through conduit 47. As the entering air is at a much higher pressure than the leaving nitrogen, no check valve subjected on its discharge side to air can be opened by the lower nitrogen pressure.

The heat exchangers 23 and 24 have been previously mentioned. Exchanger 23 has four courses: a central one, 23A, a next course 23B, a third course 23C, and an outer course 23D surrounding, as shown in the drawings, course 23C. Obviously the arrangements of the courses, and the structure of this exchanger, as well as that of others earlier mentioned, are subject to wide structural variations. Exchanger 24 has a central course 24A, an outer course 24C and an intermediate course 24B. It too is subject to wide structural variation. It will be understood that the several courses will be in good heat exchange relation with respect to each other.

It has been noted that the conduit 53 is connected with the outermost course 23D of exchanger 23. This connection is with the top of such course. The bottom of course 23D is connected by a conduit 68 with the bottom of course 24C of exchanger 24, and the top of course 24C is connected by a conduit 71 with the nitrogen outlet (the efflux connection) 72 of the single column 73. The compressed air course 63 of evaporator-condenser 60 is connected by a conduit 74 with the top of course 23B of exchanger 23. The bottom of said course is connected by a conduit 75 with a suitable pressure reducing valve device 76, which is adapted, in the particular apparatus shown, and when the latter is used for oxygen production, to effect a pressure drop between its opposite sides on the order of 88 p. s. i. This is substantially the same reduction in pressure as occurs in the expansion engine later described, when the latter is operating with its longer period of admission, as hereinafter fully explained. The low pressure side of valve device 76 is connected with a conduit 77 which leads to a condenser coil or element 78 in the lower end of the column 73. The central course (as shown), 23A, of exchanger 23 is connected at its top with a conduit 79 leading to the oxygen course 62 of the evaporator-condenser 60, while its bottom is connected with the bottom of central course 24A of exchanger 24 by a conduit 80. A conduit 81 leads from the top of the central course 24A. This is connected with the discharge of the liquid oxygen pump 95, previously mentioned and later described. The condenser unit 78 is connected at its other end (from the conduit 77), by a conduit 82, with the intermediate course 24B of exchanger 24. The top of course 24B is connected with a conduit 83, of which more will shortly be said.

Three of the four courses of exchanger 23 have been noted. The fourth course, 23C, is connected at its top with an expanded air conduit 85, and its lower end is connected by a conduit 86, containing a check valve 87 openable towards the conduit 77, and connected with the latter by a connection 88. The check valve opens towards the conduit 77, but only when the pressure in the conduit 86 is sufficient to effect opening of check valve 87 against the pressure in conduit 77.

The expansion engine 18, which may be of the construction shown in the copending Samuel C. Collins application, Ser. No. 665,206, filed April 26, 1946, provided with suitable means for predeterminedly lengthening and shortening the period of admission, or which may be of the character of the expansion engine illustrated and described in the application of Win W. Paget, Ser. No. 31,017, filed June 4, 1948, includes a cylinder 90 having admission and exhaust valves, the former shown in Fig. 5 and the latter not shown; and to the admission valve described below in connection with Fig. 5 air under pressure is admitted from the conduit 70 through a conduit 91 with which an "In" surge tank 92 is connected so as to minimize fluctuations in flow. A discharge or exhaust connection 93 leads from the expansion engine to a "Discharge" surge tank 94, which may have associated with it a strainer to catch any snow that might otherwise attain to the column while the heat exchangers 21 and 22 were not fully cooled down, during the starting of the apparatus. The expansion engine supports on the top of its cylinder the jacketed liquid oxygen pump 95 of any suitable construction, the liquid oxygen pump being for example constructed as shown, and being actuated by the expansion engine piston as shown, in the last above mentioned application of Win W. Paget, Ser. No. 31,017; and it may be noted that the conduit 81 is connected with the discharge of the liquid oxygen pump 95, while this pump has a suction connection 96 leading to it from a strainer 97, which is cooled or jacketed by liquid air, the jacket herein being represented by a coil 98. To the strainer 97 a conduit 100 leads from the evaporator-condenser chamber at the bottom of the column 73, the conduit 100 communicating with the condenser-unit-enclosing chamber 101 in the bottom of the column at a point at the desired liquid oxygen level in the latter.

The "Discharge" surge chamber 94 has connected with it a conduit 105 which is connected to a valve structure 106, which valve structure includes a passage or chamber 107 continuously in communication with the conduit 85, and another chamber 108 connectable with chamber 107 and connected through a conduit 109 directly with the interior of the column at a point spaced an appropriate distance from the top of the latter. The valve structure 106, which may be called a bypass valve, is adapted to have the two chambers mentioned connected in communication with each other, and thus to connect the "Discharge" surge chamber 94 in free communication with the upper part of the column through the conduit 105, valve structure 106, and conduit 109. The structure of this bypass valve and its operating means will be later more fully described.

The expansion engine 18 is provided, in the present particular apparatus, with valve gear adapted to permit the engine to operate with admission for a relatively short portion of its working stroke, or with admission for a considerably longer portion of its working stroke. As will later be explained more in detail, when cutoff is relatively late in the working stroke, the valve structure 106 will normally prevent communication between the "Discharge" surge chamber 94 and the column through the conduit 109; and when communication between the "Discharge" surge chamber 94 and the column is effected by the appropriate adjustment of the valve structure 106, the expansion engine will be operated with admission for the relatively short portion of its working stroke.

With an apparatus having, during low pressure oxygen production, the temperatures and pressures hereinafter mentioned, the relatively later cutoff of the expansion engine would theoretically take place at about 70% of the working stroke; and during high pressure oxygen production the relatively early cutoff would be at theoretically on the order of 25% of the working stroke, but these percentages are only illustrative. For example, there are two factors which in practice would tend to call for later cutoff in both modes of operation, namely, that it is desirable in practice to handle at least a little larger than the theoretical mass of air to insure adequate refrigeration, and moreover, with actual apparatus, the expected temperatures and pressures are not always attained.

Figures 5, 6:
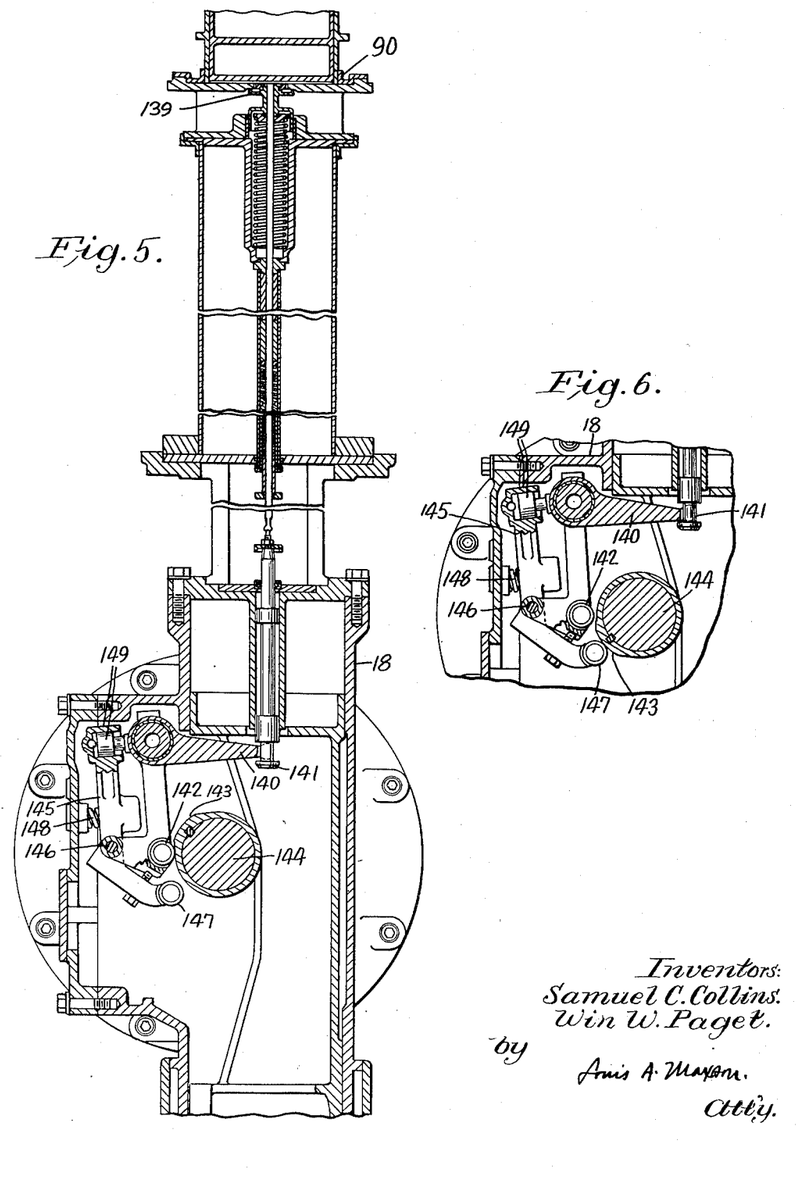
Fig. 5 is a somewhat diagrammatic, sectional view of an admission valve control mechanism having improved cutoff changing mechanism.
Fig. 6 is a fragmentary view showing the position of the parts for longer periods of admission.

Various means can be provided for effecting the desired changes in period of admission, as, for example, with a cam opened admission valve as shown in the Samuel C. Collins application Serial No. 665,206, the provision of selectively operable cams with different dwells, or cams one relatively adjustable with respect to the other. See for an example Ferguson 2,221,790, patented November 19, 1940. One very desirable means is shown in Fig. 5 of this present application, and will shortly be described. This particular structure is the illustrative embodiment of an invention disclosed and claimed in the application of Win W. Paget Serial No. 31,017.

Only such air will flow through the evaporator-condenser 60 as cannot pass through the expansion engine. By proper design, during 50-pound oxygen production, complete condensation of the fraction of air passing through the air course 63 of the evaporator-condenser 60 may be effected. If more air passes through this course than can be condensed by the available cold provided by evaporation of liquid oxygen flowing, at a pressure on the order of 50 p. s. i., in the course 62 of the evaporator-condenser 60, the excess unliquefied air will be condensed in evaporator-condenser 78.

The conduit 83, previously mentioned, leads to a pressure reducing valve 110 which is adapted to effect a reduction on the order of 60 p. s. i. in the pressure of the fluid (liquid air) which flows through it; and the low pressure side of the pressure reducing valve 110 is connected by a conduit 111 with the jacket 98 for the strainer 97; and the top of this jacket is connected by a conduit 112 with a jacket 113 of the liquid oxygen pump 95, there being a conduit 114 leading from the jacket 113 to a connection 115 through which liquid may be admitted to the top of the column 73.

The column 73 may be of any suitable construction, and is illustrated as of the conventional packed type. It may obviously assume various forms, and Samuel C. Collins now has pending two applications, Serial Nos. 26,395 and 28,870, showing columns which are well adapted for the purpose for which the present column is employed.

Figures 2, 3, 4:
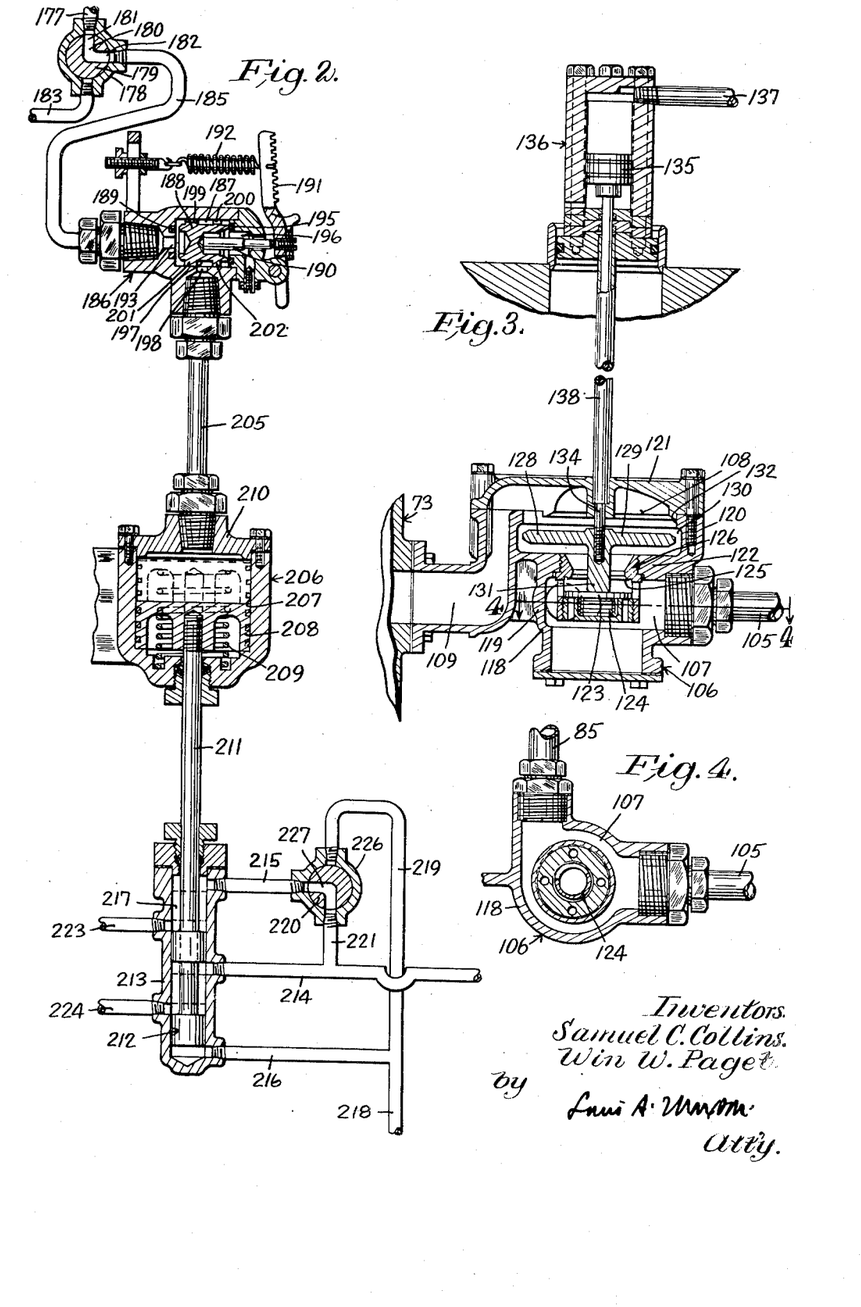
Fig. 2 is a somewhat diagrammatic view showing suitable controlling means for a bypass valve and for a device for shifting the point of cutoff of an expansion engine.
Fig. 3 is a vertical sectional view through a bypass valve mechanism suited to the apparatus disclosed.
Fig. 4 is a horizontal section through the bypass valve casing on the plane of the line 4—4 of Fig. 3.

In Fig. 3 there is shown in more detail the bypass valve mechanism 106 and pressure fluid operated means for controlling the position thereof. It will be observed that the casing 118 includes a lower portion 119 and an upper portion 120 and a cover 121. In the lower portion, the passage 107 is formed; and a wall 122 separates the chambers 107 and 108. As more fully described in the patent of Win W. Paget, No. 2,588,656, a bypass valve 123 is normally held closed by a spring 124, being then in engagement with a seat 125 formed on a plug member 126 secured in the wall 122. A disc valve element 128, in the open position of the valve 123, has a flange portion 129 approximately midway between the top and bottom of a groove 130, so that fluid may flow freely around the sides of the valve 128. A finger portion 131 is adapted to engage, unseat, and hold open the valve 123. Above the groove 130 there is a circular opening 132, which may be from twenty to thirty thousandths of an inch greater in diameter than the diameter of the disc of the valve 128, and when the valve 123 is closed, the disc or flange portion lies within the opening 132. A plunger 134 is adapted to be actuated by a piston 135 of a cylinder and piston mechanism 136, to which fluid is supplied through a conduit 137 later described. The plunger 134 is enclosed in a sleeve 138 for the purpose of minimizing leakage. On the supply of fluid to the conduit 137, the piston 135 commences to move the valve element 128, and before the latter has its portion 129 leave the opening 132, the valve 123 commences to be unseated. As will later appear, the pressure in the column 73 with which the chamber 108 communicates by way of the passage 109, is considerably less than the pressure in the "Discharge" surge chamber 94, during 50-pound oxygen production, and so air starting to flow from the chamber 107 towards the chamber 108 will act on the relatively large valve member 128 and delay the downward movement sufficiently, because of the small clearance around the periphery of the flange portion 129, when the latter lies within the opening 132, and thus, while permitting a duly prompt connection of the conduits 105 and 109, will prevent a blast of expanded air entering the column with such force as to damage the latter. In a very brief time the valve 128 will assume the position shown in Fig. 3, and will offer substantially no obstruction to flow between the conduits 105 and 109.

Fig. 5 is intended to show, very simply, one form of structure for providing for variable admission to the expansion engine 18. This is the construction of the Paget application on Expansion Engines above mentioned. The admission valve 139 is adapted to be pulled open by a bell crank lever 140 acting on a spring biased valve stem 141. The bell crank carries a cam follower roller 142 cooperating with a cam 143 on the crank shaft 144 of the expansion engine. Another bell crank 145 is pivoted at 146 on the first bell crank. It carries a second cam follower roller 147, and this is adapted to be moved, against the action of a spring 148, which normally holds it out of reach of the cam 143, into engagement with the cam 143 just as the latter is moving out of cooperative, valve-opening relation to the roller 142. A cylinder and piston mechanism 149 is operative on fluid supply thereto to move the second bell crank relative to the first to bring the second roller 147 into cooperative relation with the cam 143, and thus provide a longer period of admission (later cutoff). When fluid under pressure is supplied to the cylinder and piston mechanism 149, cutoff relatively late in the working stroke of the expansion engine is provided. When this cylinder and piston mechanism is vented, cutoff occurs much earlier in the working stroke.

The column 73 will normally be operated with a pressure on the order of 7 p. s. i., and so, in order to evaporate liquid oxygen with the latent heat of condensation of air under pressure in the condenser 78, the pressure of the air in said condenser should be on the order of 70 p. s. i., and accordingly the valve 110 is adapted to maintain a differential in pressure of about 63 p. s. i. between its upstream and downstream sides, the downstream side being substantially at column pressure, and the upstream side substantially at a pressure of 70 p. s. i. The expansion engine, when working with the later cutoff, has a pressure drop between its admission and exhaust lines equal to the difference between 158 p. s. i., the pressure in line 70, and the pressure in the line 71. Thus the expansion engine provides a pressure drop on the order of 88 p. s. i. This 88 p. s. i. drop, plus the 63 p. s. i. pressure drop previously mentioned, plus the differential in pressure of about 2 p. s. i. provided by the resistor 51, and plus the column pressure, gives a cumulative pressure of 160 p. s. i., and that is the pressure at which the two-stage compressor, not shown, which delivers air to the conduit 11, is adapted to deliver air continuously. It is to be noted that the conduit 75 and pressure reducing valve 76 are substantially in parallel with the expansion engine and the check valve 87, and accordingly the pressure reducing valve 76 is, as previously stated, set to give a pressure reduction on the order of 88 p. s. i., so that the air starting at 158 p. s. i. in the chamber 57 and passing through the air course 63, conduit 74, heat exchanger course 23B, conduit 75 and past pressure reducing valve 76 may attain to the pipe 77 at substantially the pressure at which the air is delivered through the conduit 86 from the expansion engine 18. Thus, it may be observed that the sum of the column pressure plus the reduction in pressure through the pressure reducing valve 110, plus the pressure reduction across the pressure reducing valve 76 and plus the 2 p. s. i. drop through the resistor 51 equals 160 p. s. i., the delivery pressure of the compressor supplying compressed air to the conduit 11. The two conduits in parallel provide a back pressure, as it were, against which the line 11 delivers pressure, and thus there is provided a control of the compressor discharge pressure without the use of blowoff valves or unloaders, all that is necessary being to predetermine the processing capacity of the oxygen generator and the supply capacity of the compressor so that these will be relatively similar.

The mode of operation of the described apparatus during the production of oxygen is different, depending upon whether 50-pound oxygen or oxygen suitable for cylinder charging (say at 2000 p. s. i.) is being produced. Oxygen at either pressure may be delivered. The mode of operation for the production of oxygen at 50 p. s. i. will be described first, and then the differences when oxygen at 2000 p. s. i. is to be the product will be explained. Following this, a procedure to set the plant in operation will be described.

Air is supplied continuously, as above noted, through the conduit 11 at 300° K. and 160 p. s. i., from any suitable compressor (not shown). Ordinarily a two-stage compressor with an aftercooler may be used as the source of air supply.

The entering air contains water vapor and carbon dioxide. These are caused to be separated out of the air stream by cold supplied by the leaving streams of oxygen product and nitrogen. The carbon dioxide, is largely deposited in the heat exchanger 22 upon the walls of the courses 22B and 22C, and the water vapor, as liquid water and as ice, in the courses 21B and 21C of exchanger 21; and it may be of interest at the present moment to point out that the liquid oxygen drawn from the chamber 101 in the column 73 through conduit 100, the strainer 97, and conduit 96, is pumped by the liquid oxygen pump 95 through the conduit 81, through the course 24A of heat exchanger 24, through the conduit 80, the course 23A of heat exchanger 23, conduit 79, the oxygen course 62 of the evaporator-condenser 60, the conduit 65, course 22A of heat exchanger 22, conduit 33, and the course 21A of the heat exchanger 21, and finally is delivered at the desired terminal pressure through the product delivery pipe 25. As has been previously pointed out, the nitrogen leaving the column by way of the connection 72 passes through the conduit 71, through course 24C of heat exchanger 24, through conduit 68, through course 23D of heat exchanger 23, through conduit 53, through one or the other of the courses 22B or 22C of heat exchanger 22, through one or the other of the conduits 31 or 32, through one or the other of the courses 21B or 21C of heat exchanger 21, through one or the other of the conduits 15 or 16, and through the escape 13, having passed through appropriate passage means in the valve mechanism 12. Thus it will be evident that the streams of oxygen and nitrogen passing through the heat exchangers 22 and 21 will cause the carbon dioxide and water vapor to be deposited on the walls of the passages in these exchangers through which the entering air may at any given moment be flowing, and that the water, ice and carbon dioxide snow will be carried out of the passages in which they have been deposited by the leaving nitrogen stream. The entering air will, of course, be much reduced in temperature in the exchangers 21 and 22. A portion of the air which is passed through the heat exchangers 21 and 22 is caused to pass again through the heat exchanger 22, through the course 22D thereof, as previously explained, flowing through the conduit 52, course 22D, and conduit 66 and rejoining the main mass of air which passes, during the production of low pressure oxygen, through the chamber 57 and conduit 67; and the reunited streams pass through the conduit 70 and the conduit 91 into the expansion engine to be expanded therein and to be cooled by the performance of work during the adiabatic expansion of the fluid in the expansion engine. The flow through conduit 52, course 22D of heat exchanger 22, and conduit 66 is caused by the valve 51, which provides approximately a 2-pound difference in pressure at its opposite sides.

At this point it may be noted that, regardless of the pressure of the delivered product, some of the air supplied to the apparatus for treatment therein always passes through the expansion engine 18, and some of the air always passes through evaporator-condenser 60, the quantity of air passing through evaporator-condenser 60 being determined by the cutoff of the expansion engine. When the expansion engine operates with early cutoff, more air necessarily passes through evaporator-condenser 60. During the production of oxygen at 50 p. s. i., about 12% of the total mass of entering air passes through the air course 63 of evaporator-condenser 60 in heat exchange relation with the leaving oxygen product. When oxygen at 2000 p. s. i. is the desired product, as much as 60% of all the air may pass through the air course 63 of evaporator-condenser 60. The air flowing through the conduit 67 is at a temperature of 115° K. and a pressure of 158 p. s. i. gauge. The recirculated air which flows through the conduit 66 is at a pressure of 158 p. s. i. and a temperature of 180° K. just before it joins the fluid stream in conduit 67. When the streams have been mingled in the conduit 70, all the air is at a temperature of 135° K. and a pressure of 158 p. s. i. The portion of the air which flows through the conduit 70 and does work in the expansion engine leaves the latter at a temperature of 110° K. and a pressure of 70 p. s. i. when 50-pound oxygen is to be produced. This expanded air passes through the conduit 85, through course 23C of heat exchanger 23, and emerges at a temperature of 105° K. and a pressure of 70 p. s. i. gauge, and passes the check valve 87 to mix with liquid air which has passed the pressure reducing valve 76, and there is formed a stream partially of liquid air and partially of expanded air at a temperature of 100° K. and a pressure of 70 p. s. i. It may be observed that the air from the air course 63 of the evaporator-condenser 60 emerges from heat exchanger 23 and enters the conduit 75 at a temperature of 112° K. and a pressure of 158 p.s. i. After passing through the expansion valve 76 and undergoing a drop in pressure of about 88 p. s. i., the liquid air is at the same pressure as the expanded air coming through conduit 86.

The mixture of liquid air and expanded air at a temperature of 100° K. and a pressure of 70 p. s. i. enters the condenser coil 78 and is condensed by reason of the giving up of heat in the process of vaporizing oxygen in the bottom of the column. The liquid air emerging from the condenser 78 is at a temperature of 96° K. and a pressure of 70 p. s. i., and after this liquid air has passed the pressure reducing valve 110 and has its pressure reduced by approximately 60 p. s. i. (about 63 p. s. i.), the liquid air will be at a temperature of 83° K. and a pressure of on the order of 7 p. s. i. Following the jacketing of the oxygen strainer 97 and the liquid oxygen pump 95, the still liquid air will enter the top of the column at a temperature of 83° K. and a pressure of on the order of 7 p. s. i., and it will be rectified therein so that substantially pure oxygen (99.5% pure, at least) can be drawn from an appropriate point in the evaporator-condenser arranged in the bottom of the column, at a temperature of 95° K. and a pressure of 7 p. s. i. This liquid oxygen will flow through the strainer 97, conduit 96, the liquid oxygen pump 95, the conduit 81, and the central courses, in series, of heat exchanger 24, heat exchanger 23, evaporator-condenser 60, being evaporated therein and liquefying air therein, heat exchanger 22, and heat exchanger 21, and emerge, when 50-pound oxygen is being produced, in the form of gaseous oxygen at the product pipe 25.

When oxygen for cylinder charging is to be produced, the valve structure 106 will be operated to connect the conduits 105 and 109 and the expanded air leaving the expansion engine will then pass through the conduit 105, the valve structure 106, and the conduit 109 into the column, and the pressure of the air in the conduit 105 will be reduced substantially to that within the column, and accordingly no more expanded air will be discharged through the check valve 87, because this valve will be held closed by the pressure, on the order of 70 p. s. i., which subsists in the conduit 77. At the time the valve structure 106 is operated to permit the exhaust from the expansion engine to pass substantially directly into the column through the conduit 109, the point of cutoff of the expansion engine 18 is changed to shorten very substantially the period of admission; and, the speed of the expansion engine remaining unaltered, much less—roughly half as much—air can go through the expansion engine. As a result of this, the air which cannot flow through the conduit 67 and be passed through the expansion engine will of necessity go through the air course 63 of evaporator-condenser 60, and, having passed through course 23B of heat exchanger 23, this now much larger mass of air, perhaps 60% of the total mass, will pass through the pressure reducing valve 76 and enter the condenser coil 78 of the evaporator-condenser at the bottom of the column 73 and be liquefied therein. This larger volume could not be liquefied in the evaporator-condenser 60 and the heat exchanger 23 because the oxygen, now at a much higher pressure, cannot be vaporized at the temperature of condensing air. The reduced volume of liquid air from condenser coil 78 will pass through the heat exchanger 24 by way of course 24B and next pass through conduit 83 and the pressure reducing valve 110 and then, after jacketing the strainer 97 and the liquid oxygen pump 95, will be passed into the top of the column for rectification. A much smaller percentage of the total oxygen content of the air entering the apparatus will be delivered during the production of 2000-pound oxygen than during the production of 50-pound oxygen.

In starting up the apparatus, the valve 123 will be open, and for a considerable period, on the order of two hours, the expansion engine will be operated with cutoff relatively late in the working stroke. This will mean that most of the air will pass through the expansion engine, a desirable thing at this time because there would be no oxygen to effect condensation of air in evaporator-condenser 60. The entering air, through whichever courses of heat exchangers 21 and 22 it may pass, will, considerably more than 12% of it (the expansion engine when warm cannot pass so much air through it), flow through the evaporator-condenser 60, heat exchanger 23, pressure reducing valve 76, condensing unit 78, exchanger 24, conduit 83, and past the reducing valve 110 through the jacket for the oxygen strainer 97, the jacket 113 for the liquid oxygen pump 95, and then through the conduit 114 and connection 115 into the top of the column 73. During a considerable portion of the starting operation—the cooling down period—this air will simply flow out through the conduit 71, etc. and be discharged. The relatively large amount of air which passes through the expansion engine 18 will pass into the column through the conduit 109, and it too will discharge through the conduit 71 to the atmosphere. As the unit cools down, a little liquid will commence to form, and as soon as this stage is reached, the expansion engine will be shifted to early cutoff, thus increasing the refrigeration, and for another period, perhaps an hour, the exhaust from the expansion engine will still continue to be discharged through the connection 109 into the column. When the liquid finally builds up high enough so that oxygen can be drawn through the conduit 100, the apparatus will be all ready to operate on 2000-pound oxygen production, or, by closing the valve 123 and making much later the point of cutoff of the expansion engine, 50-pound oxygen can be produced. It will be noted that during the later stages of the cooling down operations, the bypass valve 123 will still be open and the expansion engine will be working with an early cutoff, and that when the liquid level in the column reaches the overflow point, the machine will be ready to fill cylinders, but if 50-pound oxygen be desired, the bypass valve can be closed and the cams arranged in the expansion engine for late cutoff.

It has been noted that the apparatus so far described—the oxygen generator—is adapted to supply 50-pound oxygen or 2000-pound oxygen through the conduit 25. This conduit is connected at 150 with a conduit 151 which leads to a pressure reducing valve 152, from whose downstream side a conduit 153 leads to a shop line 154. With this shop line there is connected by a conduit 155 a large reservoir 156 in which gaseous oxygen at shop line pressure may be stored and which may act as a receiver. A characteristic of the pressure reducing valve 152 is that it is adapted to permit the flow of fluid from the oxygen delivery line 25 to the conduit 153, and so to the shop line, whenever the pressure in the shop line does not exceed by more than a predetermined amount, for example 10 p. s. i., the desired pressure in that line. Let it be assumed for further consideration of the invention, that 50 p. s. i. is the desired pressure to be maintained in the shop line. Then the valve 152 will permit flow from the conduit 151 to the conduit 153 so long as the pressure in the conduit 153 does not exceed 60 p. s. i., but if at any time the pressure in the shop line tends to exceed 60 p. s. i., then, regardless of the pressure in the conduit 151 and in the oxygen delivery line 25, there will not be any flow from the conduit 151 to the conduit 153, and all of the fluid in the product line 25 will necessarily have to pass elsewhere than to the shop line by way of conduit 153.

Provision is made, when the pressure in the product line 25 is high enough, for the delivery of oxygen to a suitable high pressure storage system represented in Fig. 1 by a series of six oxygen cylinders, 160, 161, 162, 163, 164 and 165, each connected with a common conduit 166 which is provided at one end with a relief valve 167 set at a pressure on the order of 2000 p. s. i., and at its other end communicates with a pressure reducing valve 170 whose characteristic is that when the shop line pressure gets 10 p. s. i. below the normally desired level (40 p. s. i. in a case where the desired value is 50 p. s. i.), fluid will be delivered from the cylinders through a conduit 171 to the conduit 153 and so to the shop line. The conduit 166 is connected by a check valve controlled conduit 173 with the junction point 150 of the oxygen product line 25 with the conduit 151. The conduit 173 has a check valve 174 in it which opens towards conduit 166 and permits flow of fluid from the conduit 173 to the conduit 166 but prevents reverse flow.

It has been pointed out that the oxygen generator is adapted to produce oxygen at 50 p. s. i. or at pressures up to 2000 p. s. i. During production of 50-pound oxygen, the expansion engine operates with relatively late cutoff and the bypass valve 123 is closed. When 2000-pound oxygen is to be the product, the bypass valve should be open and the engine operated with early cutoff. During starting, for the first couple of hours or so the bypass valve should be open and the expansion engine operated with late cutoff. Then during the final period preceding the normal production, the expansion engine should be operated with early cutoff. The bypass valve should be allowed to remain open during this further period. When the system becomes ready to produce oxygen on a suitable basis for an extended period, the control should provide for operation either with bypass valve open and early cutoff or bypass valve closed and late cutoff, depending upon the demands of the load imposed by the shop on the shop line. These functions can be accomplished by a pressure responsive pilot valve controlling the supply of fluid alternatively to mechanism for shifting the position of the bypass valve, and mechanism for controlling the point of cutoff in the expansion engine.

Desirably, the pilot valve will control the flow of fluid from the compressed air supply because this will be available from the first moment of putting the plant into operation, whereas if reliance were placed during starting on shop line pressure, both for the control fluid and for the operating fluid, unsatisfactory results would follow. It is important, however, that the controlling pressure be shop line pressure after the plant has gotten into regular production, and accordingly it is desirable to include in the system means, preferably time controlled in order that it may be automatic, following a period of subjection of the pilot valve to air supply pressure, to switch the control automatically to shop line pressure, after a period of on the order of three hours, and also to provide means for enabling the expansion engine, for a period on the order of a couple of hours, to be operated with relatively late cutoff and then automatically to make a switch to operation with early cutoff, without interfering with the admission of actuating fluid to the bypass valve opening apparatus.

Reference may now be had to Fig. 2 of the drawings, which, in conjunction with Fig. 1 and Figs. 3, 4 and 5, will show how the operations desired may be accomplished. It will be noted that a line 176 branches off of the air-under-pressure supply line 11, and that a branch 177 of the line 176 enters a valve casing 178 in which there is, by way of illustration, shown a rotatable valve 179 having a right-angle passage 180 formed therethrough and opening through its periphery, at points spaced from each other by 90°, in ports 181 and 182. There also is connected to the valve casing a branch conduit 183 leading from the shop line 153, the point of communication of the branch 183 being diametrically opposite the connection 177. Midway between the connections 177 and 182 is a further connection 185 which leads to a pilot valve device 186. This is shown of a conventional type known as the RC pilot valve, and includes a chamber 187 in which a valve 188 is reciprocable. The valve 188 is adapted to be pressed against one end seat 189 by a plunger 190, a lever 191 and a spring 192. When the air pressure transmitted to the end of the valve through a port 193 opening through the seat 189 is sufficiently high, the valve 188 will be moved against another seat 195 at the opposite end of the casing, the latter seat surrounding an opening 196 which communicates with the atmosphere. The valve 188 has a peripheral groove 197 which communicates constantly with a port 198 leading to a line to be controlled, and there are through notches 199 and 200 in collar-like portions 201 and 202 disposed respectively at the opposite sides of the groove 197. It will be evident that with the valve 179 in the position shown in Fig. 2, pressure from the air supply line 11 will be exerted on the end of the pilot valve to force the pilot valve 188 to the position in which it is shown, thus placing the port 198 in communication with the pressure coming from the air supply line. As the air supply line pressure is on the order of 160 p. s. i., and as the pilot valve is intended normally to be subject to and controlled by shop line pressure, which may desirably be maintained in the general neighborhood of 50 p. s. i., it will be evident that the pilot valve will continuously occupy the position shown in Fig. 2 and supply pressure through the port 198 as long as the valve 179 occupies the position shown. When the valve 179 is turned through 90° clockwise from the position shown in Fig. 2, the line 183 will be the source of pressure supplied to the conduit 185, and the adjustment of the tension of the spring 192 is such, and the proportions of the parts are such, that the pilot valve 188 will move to the position shown in Fig. 2 when the shop line pressure reaches, say, 50 pounds (which may be considered the desired level), and the valve 188 will move back to the seat 189 and vent fluid through the port 193 when the shop line pressure falls to a value of 45 p. s. i., that is, 5 pounds less than the desired level of pressure in the shop line. The port 198 is adapted to supply pressure to a conduit 205, which leads to a cylinder and piston mechanism 206 including a cylinder bore 207 in which there is reciprocable a suitably packed piston 208. The piston 208 has associated with it a spring 209 which forces it toward the cylinder head 210—the cylinder head with which the conduit 205 is connected—when the pilot valve 188 is in the position opposite that shown in Fig. 2. The piston 208 is connected to a piston rod 211 which is connected to a two-spool valve 212 reciprocable in the valve casing 213. With the valve casing 213, and adjacent the center of the latter, there connects a conduit 214 which constitutes an extension of the conduit 176 beyond the point at which the branch 177 leaves the latter. Conduits 215 and 216 open into the ends of the chamber 217 in which the valve 212 is reciprocable. Conduit 216 communicates continuously with a vent 218, and conduit 215 is adapted to be connected through a conduit 219 and a valve 220 with the vent, but conduit 215 may also be connected, in a different position of the valve 220, with a conduit 221, which communicates with the conduit 214. From the valve chamber 217 there lead two conduits 223 and 224. The first of these goes to the cylinder and piston mechanism 149 associated with the variable cutoff mechanism. The second is connected with the conduit 137 leading to the bypass valve control mechanism.

Referring to the valve 220, it will be observed that this is arranged in a valve casing 226 with one side of which the conduit 219 communicates, and with a diametrically opposite point in which the conduit 221 communicates. The valve 220 has a right angle port 227 adapted, in the position shown in Fig. 2, to connect the conduits 215 and 221 with each other, and, in a position 90° clockwise from that shown, to connect the conduits 215 and 219. When the conduits 215 and 219 are connected together, it will be observed that there is provided a structure in which, depending upon the position of the valve 212, the variable cutoff mechanism receives pressure while the bypass valve control is vented, or the bypass valve control receives pressure and the cylinder and piston mechanism 149 is vented. With the mechanism in the position shown in Fig. 2, the cutoff varying device receives pressure simultaneously with the supply of pressure to the bypass valve operating cylinder 136.

With one further explanation, the entire system may be briefly reviewed. The valves 179 and 220 are both manually adjustable. They are adjustable manually, to the positions which they occupy, from the positions 90° clockwise from those positions shown, which latter positions they normally occupy during operation of the oxygen generator during normal production of oxygen—whether at 50 p. s. i. or 2000 p. s. i., or some intermediate value. These valves have associated with them, preferably, devices (not shown) for moving them automatically from the positions in which they are shown to the 90°-turned positions, respectively three hours and two hours after they are moved to the position shown. Timing mechanisms for moving valves or any other elements are so well known that there are not illustrated in this application the timed operating devices for the valves 179 and 220. Suffice it to say that when the valve 179 is moved to the position shown there will desirably be set in operation an electrical, mechanical, pneumatic or hydraulic device for shifting, at the end of a period on the order of three hours, the valve 179, with a sharp or snap action, from the position shown to a position 90° clockwise from the one shown. In like manner, when the valve 220 is moved to the position shown in Fig. 2, there will be placed in operation an electrical, mechanical, pneumatic or hydraulic device for turning, at the end of a time period on the order of two hours, the valve 90° sharply clockwise. Shifting of the valves after the desired time lapses could of course be left to operator control, but in order that the system may be rendered completely automtaically operative, after it is once started up—even before any oxygen is being produced—automatic shifting means of the type mentioned may desirably be provided.

The mode of operation of the entire system may now be briefly surveyed. As a preliminary assumption, it may be imagined that the cylinders 160—165 are empty, the reservoir 156 is empty, the column is empty, and there is no pressure in the system. The air compressor (not shown) having its discharge line or receiver connected with the line 11, is not running. The operator throws the valves 179 and 220, from positions 90° clockwise from those shown, to the positions indicated in the drawings, and effects a starting of the automatic timed shifting devices. He starts the compressor. As the compressor builds up air pressure it is supplied to the line 11, and as the expansion engine 18 desirably operates in synchronism with the compressor—but desirably at a much lower number of R. P. M.—the air commences to be passed through the heat exchangers 21 and 22 and to the oxygen generator. With the valve 179 in the position shown, the pilot valve 188 shifts very promptly to the position illustrated, because it is subject to compressor discharge pressure. Compressor discharge pressure passes through the conduits 214 and 224 to the conduit 137 and opens the bypass valve 123. Compressor discharge pressure passes through the conduits 214, 221, port 227 and conduits 215 and 223 to the cylinder and piston mechanism 149, and the expansion engine operates with late cutoff, because both of the cam follower rollers will be held in position for coaction with the cam. The system operates for about two hours in the manner set forth, and then the automatic timing mechanism, or, if this were omitted, the operator, turns the valve 220 90° clockwise, venting the air from the cylinder and piston mechanism 149 and allowing cutoff to occur relatively early in the working stroke of the expansion engine. Another hour or so elapses, and, as explained above, the system is ready to deliver oxygen. Then the operator, or preferably the automatic timing mechanism, turns the valve 179 90° clockwise, and the control of the pilot valve device 186 is transferred to shop line pressure. When the shop line pressure reaches 50 pounds the pilot valve 188 will be shifted to the position shown, if it moved back from that position at the time the valve 179 is shifted. Note that conditions for producing oxygen at 2000 p. s. i. existed at the time the valve 188 stood in the position shown in Fig. 2, if the liquid oxygen in the chamber 101 had reached the level of the mouth of the pipe 100. Let it be assumed, however, that, regardless of what may have intervened, the pressure in the pipe 185 supplied from the shop line through the connection 183 attains to 50 p. s. i. This means that the pilot valve will assume the position shown in Fig. 2, the piston 208 will assume the position shown in Fig. 2, and the valve 212 will assume the position shown in Fig. 2. Then the bypass valve would be opened and the cutoff made early, and gaseous oxygen would be delivered past the check valve 174 to the tanks. Some of the gaseous oxygen would continue to be supplied past the pressure reducing valve 152 to the shop line at any time the pressure in the shop line was below 60 pounds, that is, ten pounds more than the desired pressure level of 50 p. s. i. If the pressure, due to excess demand, falls off to 45 p. s. i. in the shop line, the pilot valve 188 will shift to its opposite position, venting fluid from the cylinder 207, and the spring 209 will move the two-spool valve 212 to its opposite extreme position, thus supplying fluid through the conduit 223 to effect later cut-off and venting of pressure from the conduit 224 to permit the bypass valve to close. Note that a spring may be associated with the piston 135, if this be desired, in order not to have to impose on the spring 124 the burden of raising the piston 135 and its piston rod. The plant, operating with the bypass valve closed and relatively later cut off will produce more oxygen, and it is possible, depending on demand, that the pressure in the shop line 154 will then build up. If, however, it does not do so, but continues to fall until it reaches a value 10 pounds less than the desired value of 50 pounds, the valve mechanism 179 will permit fluid to flow from the cylinder bank to the shop line to supplement the oxygen from the generator.

It has been explained that the valves 179 and 220 may be moved by timed operating devices to the positions 90° clockwise from those shown. They may, of course, be so moved as by springs in which energy is stored when the valves are moved to the positions shown, and the valves may be latched in the positions shown and have time controlled latch release mechanisms. It will be evident that the cylinder and piston mechanism 206 constitutes a servomotor.

From what has been said, it will be apparent that a system wholly automatic from the very starting up thereof has been provided; one adapted to produce oxygen under the preferable conditions associated with 50 p. s. i. production except when shop line demand is low; and one which is adapted to be automatically shifted to production at the higher pressure when its production of 50-pound oxygen is in excess of demand and thereby enable the storage at high pressure of the oxygen which will then be generated. Further, it will be observed that there is a system provided in which, when the demand is in excess of generator output, fluid will be supplied from the storage system in response to falling pressure in the shop line. Other advantages of the system need not be repeated here, as they will be self-evident from what has been said.

In conclusion, it may be noted that pressures referred to are gauge unless otherwise indicated, and that pressure losses due to friction in conduits, etc. have been ignored for simplicity in giving summations of pressure drops through the generator, rather than assigning values to such losses and reducing correspondingly some of the figures listed for pressure reductions.

This application is a continuation in part of our copending but now abandoned application Ser. No. 31,018, filed June 4, 1948, with corresponding title.

While there is in this application specifically described one form which the invention may assume in practice, it will be understood that this form of the same has been shown for purposes of illustration and that the invention may be modified and embodied in various other forms without departing from its spirit or the scope of the appended claims.

What is claimed as new and is desired to be secured by Letters Patent is:

1. In an apparatus for supplying gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level, means for storing the gas at a pressure greatly exceeding such preferred level, a one-way flow connection between said generator and said storing means communicating freely with the former during the furnishing of gas thereby both at a pressure on the order of the preferred level and at a pressure greatly exceeding such preferred level, means for permitting gas supply from said generator to said line including a connection between them having therein flow controlling means for automatically preventing flow through said connection to the line when line pressure is at a level exceeding by a predetermined amount said preferred level, and means for permitting gas supply from said storing means to said line including a connection between them having therein flow-controlling means for preventing flow to said line except when the pressure in said line is at a level a predetermined amount below said preferred level.

2. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level, a gas receiving chamber in free communication with said line, means for storing the gas at a pressure greatly exceeding such preferred level, a one-way flow connection between said generator and said storing means communicating freely with the former during the furnishing of gas thereby both at a pressure on the order of the preferred level and at a pressure greatly exceeding such preferred level, means for permitting gas supply from said generator to said line including a connection between them having therein flow controlling means for automatically preventing flow through said connection to the line when line pressure is at a level exceeding by a predetermined amount said preferred level, and means for permitting gas supply from said storing means to said line including a connection between them having therein flow-controlling means for preventing flow to said line except when the pressure in said line is at a level a predetermined amount below said preferred level.

3. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level, a gas receiving chamber in free communication with said line, means for storing the gas at a pressure greatly exceeding such preferred level, a one-way flow connection between said generator and said storing means communicating freely with the former during the furnishing of gas thereby both at a pressure on the order of the preferred level and at a pressure greatly exceeding such preferred level, means for permitting gas supply from said generator to said line including a connection between them having therein flow controlling means for automatically preventing flow through said connection to the line when line pressure is at a level exceeding by a predetermined amount said preferred level but permitting flow to said line at all lower pressures in said line, and means for permitting gas supply from said storing means to said line including a connection between them having therein flow-controlling means for preventing flow to said line except when the pressure in said line is at a level a predetermined amount below said preferred level.

4. In an apparatus for supplying a gas to a line subjected to a fluctuating demand and in which it is desired to maintain the gas available at pressures between limits respectively exceeding, and less than, a preferred level by pedetermined amounts, a generator for the gas having provision for furnishing the same at a pressure on the order of the preferred level and at a pressure greatly exceeding such preferred level, means for storing the gas at a pressure greatly exceeding such preferred level, pressure relief means associated with said gas storing means, a one-way flow connection between said generator and said storing means communicating freely with the former during the furnishing of gas thereby both at a pressure on the order of the preferred level and at a pressure greatly exceeding such preferred level, means for permitting gas supply from said generator to said line including a connection between them having therein flow controlling means for automatically preventing flow through said connection to the line when line pressure is at a level exceeding by a predetermined amount said preferred level, and means for permitting gas supply from said storing means to said line including a connection between them having therein flow-controlling means for preventing flow to said line except when the pressure in said line is at a level a predetermined amount below said preferred level.

5. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level, means for storing the gas at a pressure greatly exceeding such preferred level, a one-way flow connection between said generator and said storing means, means for permitting gas supply from said generator to said line including a connection between them having therein flow controlling means for automatically preventing flow through said connection to the line when line pressure is at a level exceeding by a predetermined amount said preferred level means for permitting gas supply from said storing means to said line including a connection between them having therein flow-controlling means for preventing flow to said line except when the pressure in said line is at a level a predetermined amount below said preferred level, and means controlled by line pressure for changing said generator from the furnishing of gas at a pressure on the order of the preferred level to the furnishing of gas at a higher pressure, and vice versa.

6. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column, and pressure operable means for changing the point of cutoff of said expansion engine and the point in the column to which air from said expansion engine is delivered, means for storing the gas at a pressure greatly exceeding such preferred level, a one-way flow connection between said generator and said storing means, means for permitting gas supply from said generator to said line including a connection between them having therein flow controlling means for automatically preventing flow through said connection to the line when line pressure is at a level exceeding by a predetermined amount said preferred level, means for permitting gas supply from said storing means to said line including a connection between them having therein flow-controlling means for preventing flow to said line except when the pressure in said line is at a level a predetermined amount below said preferred level, and means controlled by line pressure for changing said generator from the furnishing of gas at a pressure on the order of the preferred level to the furnishing of gas at a higher pressure and vice versa, said last mentioned means including a pilot valve responsive to line pressure and controlling said pressure operable means.

7. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column, and pressure operable means for changing the point of cutoff of said expansion engine and the point in the column to which air from said expansion engine is delivered, means for storing the gas at a pressure greatly exceeding such preferred level, a one-way flow connection between said generator and said storing means, means for permitting gas supply from said generator to said line including a connection between them having therein flow controlling means for automatically preventing flow through said connection to the line when line pressure is at a level exceeding by a predetermined amount said preferred level, means for permitting gas supply from said storing means to said line including a connection between them having therein flow-controlling means for preventing flow to said line except when the pressure in said line is at a level a predetermined amount below said preferred level, and means controlled by line pressure for changing said generator from the furnishing of gas at a pressure on the order of the preferred level to the furnishing of gas at a higher pressure and vice versa, said last mentioned means including a pilot valve responsive to line pressure and controlling fluid flow from a source of substantially constant pressure to said pressure operable means.

8. In an apparatus for supplying a gas to a line subjected to a fluctuating demand and in which it is desired to maintain the gas available at pressures within predetermined amounts above and below a preferred level, a generator for the gas having provision for furnishing the same at a pressure on the order of such preferred level and at a pressure greatly exceeding such preferred level, means for storing the gas at a pressure greatly exceeding such preferred level, means for delivering gas from said generator to said line and to said storing means, and means controlled by the line pressure for changing said generator from the generation of gas at a pressure on the order of the preferred level to the generation of gas at a higher pressure, and vice versa.

9. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column and means for changing the range of expansion of said expansion engine and the point in the column to which air from said expansion engine is delivered, and means controlled by line pressure for changing said generator from the furnishing of gas at a pressure on the order of the preferred level to the furnishing of gas at a higher pressure and vice versa, said last mentioned means including means responsive to line pressure and controlling said changing means.

10. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column and means for changing the point of cutoff of said expansion engine and the point in the column to which air from said expansion engine is delivered, and means controlled by line pressure for changing said generator from the furnishing of gas at a pressure on the order of the preferred level to the furnishing of gas at a higher pressure and vice versa, said last mentioned means including a pressure operable means responsive to line pressure and controlling said changing means.

11. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column, and pressure operable means for changing the point of cutoff of said expansion engine and the point in the column to which air from said expansion engine is delivered, and means controlled by line pressure for changing said generator from the furnishing of gas at a pressure on the order of the preferred level to the furnishing of gas at a higher pressure and vice versa, said last mentioned means including a pilot valve responsive to line pressure and controlling said pressure operable means.

12. In an apparatus for supplying a gas to a line subjected to a fluctuating demand and in which it is desired to maintain the gas available at pressures between limits respectively exceeding, and less than, a preferred level by predetermined amounts, a generator for the gas having provision for furnishing the same at a pressure on the order of the preferred level and at a pressure greatly exceeding such preferred level and including a column and an expansion engine delivering exhaust air to the column, and pressure operable means for changing the point of cutoff of said expansion engine and the point in the column to which air from said expansion engine is delivered, and means controlled by line pressure for changing said generator from the furnishing of gas at a pressure on the order of the preferred level to the furnishing of gas at a higher pressure and vice versa, said last mentioned means including a pilot valve responsive to line pressure and controlling fluid flow from a source of substantially constant pressure to said pressure operable means.

13. In an apparatus for supplying a gas to a conduit subjected to a fluctuating demand, a generator for the gas having as parts thereof an expansion engine and a column receiving fluid exhausted by the expansion engine, mechanism for changing the point of cutoff of said expansion engine, mechanism for changing the point of introduction of fluid exhausted by the expansion engine into the column, and means including a device responsive to the pressure in said conduit for governing the operation of said mechanisms.

14. In an apparatus for supplying a gas to a conduit which is subjected to a fluctuating demand, a generator for the gas having as parts thereof an expansion engine and a column receiving fluid exhausted by said expansion engine, mechanism for changing the point of cutoff of said expansion engine, mechanism for changing the point of introduction into the column of fluid exhausted by the expansion engine, a control device responsive to the pressure in said conduit, and mechanism governed by said control device for effecting the subjection of said mechanisms for changing the point of cutoff of the expansion engine and for changing the point of introduction into the column of fluid exhausted by the expansion engine to an operating medium and relieving them from such subjection.

15. In an apparatus for supplying a gas to a line subjected to a fluctuating demand, a generator for the gas having as parts thereof an expansion engine and a column receiving fluid exhausted by said expansion engine, pressure fluid controlled means for changing the point of cutoff of said expansion engine, pressure fluid controlled means for changing the point of introduction of fluid exhausted by the expansion engine into the column, a source of fluid under pressure at other than line pressure, a pilot valve responsive to line pressure, and means controlled by said pilot valve for supplying and venting fluid from said source relative to said pressure fluid controlled means.

16. In an apparatus for supplying a gas to a line subjected to a fluctuating demand, a generator for the gas having as parts thereof an expansion engine and a column receiving fluid exhausted by said expansion engine, pressure fluid controlled means for changing the point of cutoff of said expansion engine, pressure fluid controlled means for changing the point of introduction of fluid exhausted by the expansion engine into the column, a source of fluid at greater than line pressure, a pilot valve normally responsive to line pressure, means controlled by said pilot valve for supplying and venting fluid from said source relative to said fluid controlled means, and means for temporarily subjecting said pilot valve to control by the fluid from said source upon starting up of said apparatus.

17. In an apparatus for supplying a gas to a line subjected to a fluctuating demand, a generator for the gas having as parts thereof an expansion engine and a column receiving fluid exhausted by said expansion engine, pressure fluid controlled means for changing the point of cutoff of said expansion engine, pressure fluid controlled means for changing the point of introduction of fluid exhausted by the expansion engine into the column, a source of fluid at greater than line pressure, a pilot valve normally responsive to line pressure, means controlled by said pilot valve for supplying and venting fluid from said source relative to said fluid controlled means, means for temporarily subjecting said pilot valve to control by the fluid from said source upon starting up of said apparatus, and means for returning said pilot valve to the control of line pressure.

18. In an apparatus for supplying a gas to a line subjected to a fluctuating demand, a generator for the gas having as parts thereof an expansion engine and a column receiving fluid exhausted by said expansion engine, pressure fluid controlled means for changing the point of cutoff of said expansion engine, pressure fluid controlled means for changing the point of introduction of fluid exhausted by the expansion engine into the column, a source of fluid at greater than line pressure, a pilot valve responsive to line pressure, means controlled by said pilot valve for supplying and venting fluid from said source relative to said pressure fluid controlled means, and means for temporarily reversing the relation of one of said pressure controlled means to fluid supply and venting.

19. In an apparatus for supplying a gas to a line subjected to a fluctuating demand, a generator for the gas having as parts thereof an expansion engine and a column receiving fluid exhausted by said expansion engine, pressure fluid controlled means for changing the point of cutoff of said expansion engine, pressure fluid controlled means for changing the point of introduction of fluid exhausted by the expansion engine into the column, a source of fluid at greater than line pressure, a pilot valve normally responsive to line pressure, means controlled by said pilot valve for supplying and venting fluid from said source relative to said fluid controlled means, means for temporarily reversing the relation of one of said pressure controlled means to supply and venting as normally established by said pilot valve controlled means, and means for temporarily subjecting said pilot valve to control by the fluid from said source upon starting up of said apparatus.

20. In a controlling apparatus for a gas generator which constitutes a source of gas supply for a delivery conduit and includes an expansion engine having at least two different points of cutoff, a column receiving the exhaust of said expansion engine, and a valve movable to change the point of delivery of the exhaust of said expansion engine to the column, a device for effecting change in the point of cutoff, a device for effecting a change in the position of said valve, means movable to control action upon each of said devices of an operating medium, and means governed by the pressure in said conduit for which said generator constitutes a source of supply for governing the position of said means movable to control the action of said operating medium upon said devices.

21. In a controlling apparatus for a gas generator which constitutes a source of gas supply for a delivery line and includes an expansion engine having at least two different points of cutoff, a column receiving the exhaust of said expansion engine, and a valve movable to change the point of delivery of the exhaust of said expansion engine to the column, a pressure fluid actuated device for effecting change in the point of cutoff, a pressure fluid actuated device for effecting a change in the position of said valve, valve means movable to control the supply and venting of fluid relative to each of said pressure fluid actuated devices, and means governed by the pressure in the delivery line for which said generator constitutes a source of supply for governing the position of said valve means.

22. In a controlling apparatus for a gas generator which constitutes a source of gas supply for a delivery line and includes an expansion engine having at least two different points of cutoff, a column receiving the exhaust of said expansion engine, and a valve movable to change the point of delivery of the exhaust of said expansion engine to the column, a pressure fluid actuated device for effecting change in the point of cutoff, a pressure fluid actuated device for effecting a change in the position of said valve, valve means movable to control the supply and venting of fluid relative to each of said pressure fluid actuated devices, means normally governed by the pressure in the delivery line for which said generator constitutes a source of supply for governing the position of said valve means, and means for shifting the governing of said means to a higher pressure.

23. In a controlling apparatus for a gas generator which constitutes a source of gas supply for a delivery line and includes an expansion engine having at least two different points of cutoff, a column receiving the exhaust of said expansion engine, and a valve movable to change the point of delivery of the exhaust of said expansion engine to the column, a pressure fluid actuated device for effecting change in the point of cutoff, a pressure fluid actuated device for effecting a change in the position of said valve, and means governed by the pressure in the delivery line for which said generator constitutes a source of supply for controlling the supply and venting of fluid relative to each of said pressure fluid actuated devices, said means governed by the pressure in the delivery line for which said generator constitutes a source of supply including a pilot valve responsive to line pressure, a servomotor controlled by said pilot valve and valve means movable by said servomotor and controlling the supply and venting of fluid relative to said pressure fluid actuated devices.

24. In a controlling apparatus for a gas generator which constitutes a source of gas supply for a delivery line and includes an expansion engine having at least two different points of cutoff, a column receiving the exhaust of said expansion engine, and a valve movable to change the point of delivery of the exhaust of said expansion engine to the column, a pressure fluid actuated device for effecting change in the point of cutoff, a pressure fluid actuated device for effecting a change in the position of said valve, and means governed by the pressure in the delivery line for which said generator constitutes a source of supply for controlling the supply and venting of fluid relative to each of said pressure fluid actuated devices, said means governed by the pressure in the delivery line for which said generator constitutes a source of supply including a pilot valve responsive to line pressure, a servomotor controlled by said pilot valve and valve means movable by said servomotor and controlling the supply and venting of a fluid at a pressure in excess of line pressure relative to said pressure fluid actuated devices.

25. In a controlling apparatus for a gas generator which constitutes a source of gas supply for a delivery line and includes an expansion engine having at least two different points of cutoff, a column receiving the exhaust of said expansion engine, and a valve movable to change the point of delivery of the exhaust of said expansion engine to the column, a pressure fluid actuated device for effecting change in the point of cutoff, a pressure fluid actuated device for effecting a change in the position of said valve, and means governed by the pressure in the delivery line for which said generator constitutes a source of supply for controlling the supply and venting of fluid relative to each of said pressure fluid actuated devices, said means governed by the pressure in the delivery line for which said generator constitutes a source of supply including a pilot valve responsive to line pressure, a servomotor controlled by said pilot valve and valve means movable by said servomotor and controlling the supply and venting of a fluid at a pressure in excess of line pressure relative to said pressure fluid actuated devices and effecting fluid supply to one of the same while venting the other.

SAMUEL C. COLLINS.
WIN W. PAGET.

REFERENCES CITED

The following references are of record in the file of this patent:

UNITED STATES PATENTS

| Number | Name | Date |
|---|---|---|
| 1,943,059 | Dana | Jan. 9, 1934 |
| 2,028,119 | Boshkoff | Jan. 14, 1936 |